(12) United States Patent
Blease et al.

(10) Patent No.: US 6,481,841 B1
(45) Date of Patent: Nov. 19, 2002

(54) INK JET PRINTING METHOD

(75) Inventors: James W. Blease, Rochester, NY (US); Steven Evans, Rochester, NY (US); Karen J. Klingman, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/920,105

(22) Filed: Aug. 1, 2001

(51) Int. Cl.7 .................................................. B41J 2/01
(52) U.S. Cl. ........................................ 347/100; 347/101
(58) Field of Search ................................ 347/100, 101; 106/31.47, 31.46

(56) References Cited

U.S. PATENT DOCUMENTS

| | | | |
|---|---|---|---|
| 4,975,094 A | * 12/1990 | Miki et al. ...................... | 8/537 |
| 5,747,146 A | * 5/1998 | Kashiwazaki et al. ...... | 347/100 |
| 6,120,589 A | * 9/2000 | Bannai et al. ........... | 106/31.43 |
| 6,152,969 A | * 11/2000 | Matsumoto et al. ...... | 106/22 H |

FOREIGN PATENT DOCUMENTS

| | | | | |
|---|---|---|---|---|
| JP | 02016171 | * | 1/1990 | ........... C09D/11/00 |
| WO | WO 01/18123 A1 | | 3/2001 | |

* cited by examiner

*Primary Examiner*—John Barlow
*Assistant Examiner*—Manish Shah
(74) *Attorney, Agent, or Firm*—Harold E. Cole

(57) ABSTRACT

An ink jet printing method, having the steps of: A) providing an ink jet printer that is responsive to digital data signals; B) loading the printer with an ink-receiving element having a support having thereon an ink-receiving layer, C) loading the printer with an ink jet ink set for color printing having: (a) a yellow ink having a carrier and a yellow azoaniline dye; (b) a magenta ink having a carrier and a magenta anthrapyridone dye; and (c) a cyan ink having a carrier and Direct Blue 307; and D) printing on the ink-receiving layer using the ink jet ink in response to the digital data signals.

14 Claims, No Drawings

INK JET PRINTING METHOD

CROSS REFERENCE TO RELATED APPLICATIONS

Reference is made to commonly assigned, co-pending U.S. Patent Applications:

Ser. No. 09/920,167 by Blease et al., filed Aug. 1, 2001 "Ink Jet Ink Set";

Ser. No. 09/920,188 by Blease et al., filed Aug. 1, 2001 "Dye Mixture for Ink Jet Ink";

Ser. No. 09/920,400 by Gallo et al., filed Aug. 1, 2001 "Ink Jet Printing Method";

Serial No. 09/918,737 my Blease et al., filed Aug. 1, 2001 "Ink Jet Ink Set"; and Serial No. 09/919,978 by Gallo et al., filed Aug. 1, 2001 "Ink Jet Printing Method".

FIELD OF THE INVENTION

This invention relates to an ink jet printing method using inks for ink jet printing that provide images with good lightfastness and improved color gamut.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic co-solvents and high boiling organic solvents, such as hydrocarbons, esters, ketones, etc. For aqueous dye-based inks, the dyes needs to be sufficiently soluble in water to prepare a solution that is capable of producing adequate density on the receiving element and stable for extended periods of storage without precipitation. High quality ink jet printing with dye-based inks requires dyes which will provide both bright hue and good light fastness.

To generate full color prints via ink jet printing, ink sets comprising at least cyan, magenta and yellow inks are normally utilized. In addition a black ink is often added to enhance the printing of text and darker colors. The range of colors that can be produced with a given set of inks defines the color gamut of that ink set. For the production of high quality photorealistic images via ink jet printing, ink sets with a large color gamut are preferred. In addition, it is important that the ink sets produce images with good fastness, especially to light.

The choice of the colorants in ink jet systems is critical for both light fastness and color gamut. The color gamut of an ink set is controlled primarily by the spectral absorption characteristics of the component dyes. The primary dyes (e.g., cyan, magenta and yellow) should only absorb light of the required wavelengths (i.e., have relatively narrow absorption bands) and not overlap excessively with the dyes in the complementary inks. While there are many dyes with bright hues that are useful in ink jet printing, many have poor light fastness. Conversely many light stable dyes suitable for ink jet printing have broad absorption bands but give dull colors and limited color gamut.

WO 01/18123 relates to the use of magenta anthrapyridone dyes for ink jet inks. While there is a disclosure of other color ink jet inks used with this magenta dye, the color gamut of these combinations is not as large as one would like.

It is an object of this invention to provide an inkjet printing method using a set of inks capable of producing images via ink jet printing which have better color gamut than the ink sets of the prior art.

SUMMARY OF THE INVENTION

This and other objects are achieved in accordance with the present invention comprising an ink jet printing method, comprising the steps of:

A) providing an ink jet printer that is responsive to digital data signals;

B) loading the printer with an ink-receiving element comprising a support having thereon an ink-receiving layer;

C) loading the printer with an ink jet ink set for color printing comprising:
 (a) a yellow ink comprising a carrier and a yellow azoaniline dye;
 (b) a magenta ink comprising a carrier and a magenta anthrapyridone dye, and
 (c) a cyan ink comprising a carrier and Direct Blue 307; and D) printing on the ink-receiving layer using the ink jet ink in response to the digital data signals.

DETAILED DESCRIPTION OF THE INVENTION

Dyes referred to by dye numbers are numbers assigned by The Color Index.

Any yellow azoaniline dye may be used in the invention. In a preferred embodiment, the yellow azoaniline dye is Direct Yellow 132, Direct Yellow 107, Direct Yellow 86 or mixtures thereof.

Any magenta anthrapyridone dye may be used in the invention, as disclosed, for example, in U.S. Pat. No. 6,152,969; EP 1,063,268, EP 1,067,155; WO 00/23440; WO 01/18123; JP 2000-256587 and JP 2001-072884, the disclosures of which are hereby incorporated by reference. In a preferred embodiment, the magenta anthrapyridone dye is a sulfonic acid or sulfonate derivative of a compound represented by the general formula:

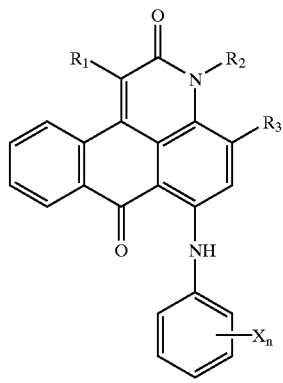

wherein:
$R_1$ represents hydrogen, or a substituted or unsubstituted alkoxycarbonyl, carboxyl, benzoyl, alkyl, aryl, hetaryl, alkoxy or phenoxy group,
$R_2$ represents hydrogen or a substituted or unsubstituted alkyl, alicyclic, aryl or hetaryl group;
$R_3$ represents hydrogen, carboxyl, or a substituted or unsubstituted alkyl, alicyclic, aryl, hetaryl, alkoxy or phenoxy group;
each X independently represents hydrogen, halogen, nitro, hydroxyl, carboxyl, or a substituted or unsubstituted alkyl, alicyclic, aryl, hetaryl, alkoxy, phenoxy, amino, amido or sulfonamido group; and
n represents 0, 1, 2 or 3.

In a preferred embodiment of the invention, $R_1$ in the above formula is benzoyl. In another preferred embodiment, $R_2$ is hydrogen. In yet another preferred embodiment, $R_3$ is a sulfonated phenoxy group. In yet still another preferred embodiment, n is 1 and X is a sulfonate group.

A preferred magenta dye which can be used in the invention is sold commercially as JPD Magenta EK-1 Liquid, from Nippon Kayaku Kabusbiki Kaisha as an approximately 10% solution in water.

As noted above, the cyan dye employed in the invention is Direct Blue 307. This dye is sold commercially as ProJet® Fast Cyan 2 Liquid from Avecia Corp.

In yet another preferred embodiment of the invention, a black ink can be added to the ink jet ink set to further increase the available color gamut. Black inks which can be used include a carrier and a black colorant such as Reactive Black 31, Direct Black 19, Direct Black 168, Solubilized Sulfur Black 1 (Duasyn® Black SU-SF) or a black pigment.

In general, the inks employed in this invention comprise the above dyes at concentration of from about 0.1 to about 10%, preferably from about 0.4 to about 5% by weight of the inkjet ink composition.

In yet still another preferred embodiment of the invention, additional inks of a "light" cyan ink or "light" magenta ink, which is the same cyan and magenta dyes in (c) and (b), except that they are employed at a concentration of about 5% to about 50% of the amount of the cyan and magenta dyes.

For the purpose of this invention, color gamut is specified in the CIELAB metric. Color gamut is defined as the sum of the a*-b* areas of 9 L* slices (L*=10, 20, 30, 40, 50, 60, 70, 80 and 90) obtained when a given ink set is used. Color gamut may be obtained through measurement and estimation from a large sample of color patches which is very tedious and time-consuming, or calculated from the measured absorption characteristics of the individual dyes using the techniques described in J. Photographic Science, 38, 163 (1990).

The absorption characteristics of a given image dye will vary to some extent with a change in ink laydown or printed density. This is due to factors such as measurement flare, dye-dye interactions, dye-receiver interactions, dye concentration effects, and the presence of colored impurities in the media. However, by using characteristic vector analysis, sometimes referred to as principal component analysis or eigenvector analysis, one can determine a characteristic absorption curve that is representative of the absorption characteristics of the dye over the complete wavelength and density ranges of interest. The characteristic vector for each dye is thus a two-dimensional array of optical density and wavelength. This technique is described by Albert J. Sant in Photographic Science and Engineering, 5(3), May–June 1961 and by J. L. Simonds in the Journal of the Optical Society of America, 53(8), 968–974 (1963). Characteristic vectors thus derived can be used to calculate the color gamuts of ink sets described below as described in the above reference.

The following commercially available yellow and black dyes can be used to formulate the ink sets employed in this invention:

A. Direct Yellow 132, available as ProJet® Yellow 1G from Avecia Corp. as an approximately 7.5% solution in water
B. Direct Yellow 107, available as Intrajet® Yellow DG from Crompton and Knowles as an approximately 10% solution in water
C. Reactive Black 31, available as Duasyn® Black KRL-SF from Clariant Corp. as an approximately 10% solution in water
D. Direct Black 168, available as Duasyn® Black HEF-SF from Clariant Corp. as an approximately 10% solution in water
E. Solubilized Sulfur Black 1, available as Duasyn® Black SU-SF from Clariant Corp. as an approximately 10% solution in water
F. Direct Black 19, available as Keyamine® Black G Pure Liquid from Keystone Corp. as an approximately 10% solution in water
G. Direct Yellow 86, available as Direct Yellow 86 Na Solution from Sensient Technical Colors LLC as an approximately 10% solution in water A humectant is usually employed in the ink jet composition employed in the invention to help prevent the ink from drying out or crusting in the orifices of the printhead. Examples of humectants which can be used include polyhydric alcohols, such as ethylene glycol, diethylene glycol (DEG), triethylene glycol, propylene glycol, tetraethylene glycol, polyethylene glycol, glycerol, 2-methyl-2,4-pentanediol, 2-ethyl-2-hydroxymethyl-1,3-propanediol (EHMP)), 1,5 pentanediol, 1,2-hexanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl, mono-ethyl or mono-butyl ether (TEGMBE), diethylene glycol di-methyl or di-ethyl ether, poly(ethylene glycol) monobutyl ether (PEGMBE), and diethylene glycol monobutylether (DEGMBE); nitrogen-containing compounds, such as urea, 2-pyrrolidinone, N-methyl-2-pyrrolidinone, and 1,3-dimethyl-2-imidazolidinone; and sulfur-containing compounds such as dimethyl sulfoxide and tetramethylene sulfone.

Preferred humectants for the inks employed in the invention include DEG, glycerol, DEGMBE, TEGMBE, 1,2- hexanediol, 1,5-pentanediol, urea, 2-pyrrolidinone, EHMP and mixtures thereof. The humectant may be employed in each ink in an amount of from about 5 to about 60 weight percent.

Water-miscible organic solvents may also be added to the aqueous inks employed in the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

The amount of aqueous carrier employed is in the range of approximately 70 to 98 weight %, preferably approximately 90 to 98 weight %, based on the total weight of the ink. A mixture of water and a polyhydric alcohol, such as diethylene glycol, is useful as an aqueous carrier. In a preferred embodiment, the inks contain from about 5 to about 60 weight % of water miscible organic solvent. Percentages are based on the total weight of the aqueous carrier.

Surfactants may be added to the ink to adjust the surface tension to an appropriate level. The surfactants may be anionic, cationic, amphoteric or nonionic and used at levels of 0.01 to 1% of the ink composition. Preferred surfactants include Surfynol® 465 (available from Air Products Corp.) and Tergitol® 15-S-5 (available from Union Carbide).

A biocide may be added to the ink composition employed in the invention to suppress the growth of microorganisms such as molds, fungi, etc. in aqueous inks. A preferred biocide for the ink composition employed in the present invention is Proxel® GXL (Avecia Corp.) at a final concentration of 0.0001–0.5 wt. %.

The pH of the aqueous ink compositions employed in the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition employed in the invention may comprise, for example, the following components by weight: colorant (0.05–20%), water (20–95%), a humectant (5–70%), water miscible co-solvents (2–20%), surfactant (0.1–10%), biocide (0.05–5%) and pH control agents (0.1–10%).

Additional additives which may optionally be present in the ink jet ink compositions employed in the invention include thickeners, conductivity enhancing agents, anti-kogation agents, drying agents, and defoamers.

The ink jet inks employed in this invention may be used in ink jet printing wherein liquid ink drops are applied in a controlled fashion to an ink receptive layer substrate, by ejecting ink droplets from a plurality of nozzles or orifices of the print head of an inkjet printer.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

Ink jet inks employed in the present invention can be used in any of the popular ink jet printing systems, including thermal or piezoelectric drop-on-demand printers and continuous inkjet printers. Of course, the specific ink formulations will vary depending upon the type of ink jet printing system.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following example illustrates the utility of the present invention.

EXAMPLE

A control ink containing the following cyan dye was prepared and evaluated as a comparative example:
C-1: contains Direct Blue 199, available as Direct Blue 199 Na Solution from Sensient Colors LLC as an approximately 10% solution in water. Direct Blue 199 as disclosed in WO 01/18123.

Preparation of Inks

Inks 1–5 used in the ink jet ink sets of the invention and control ink C-1 were prepared by dissolving an appropriate amount of the dye or dye concentrate in de-ionized water and a mixture of one or more water soluble organic compounds such as humectants and surfactants. The humectants used in Inks 1–5 and C-1 were glycerol at 11.5 wt. %, DEG at 11.5 wt. % and TEGMBE at 7.5 wt. %, all based on the total weight of the ink. The pH values of Inks 1, 2, 3, 5 and C-1 were adjusted to approximately 8–9 by the addition of triethanolamine. Details are given in Table 1 below.

TABLE 1

| Ink | Dye (Wt. %) |
| --- | --- |
| 1 | Direct Blue 307 (3.6) |
| 2 | JPD EK-1 (4.8) |
| 3 | A (3.8) |
| 4 | C (6.0) |
| 5 | G (3.5) |
| C-1 | Direct Blue 199 (3.5) |

Ink Jet Recording Element

An ink jet recording element was prepared as follows:

A coating solution for a base layer was prepared by combining fumed alumina (Cab-O-Sperse® PG003, Cabot Corp.), poly(vinyl alcohol) (Gohsenol® GH-23A, Nippon Gohsei Co., Ltd.) and 2,3-dihydroxy-1,4-dioxane (Clariant Corp.) in a ratio of 88:10:2 to give an aqueous coating formulation of 30% solids by weight.

A coating solution for an image-receiving layer was prepared by combining fumed alumina (Cab-O-Sperse® PG003, Cabot Corp.), poly(vinyl alcohol) (Gohsenol® GH-23A, Nippon Gohsei Co.) and a copolymer of (vinylbenzyl)trimethylammonium chloride and divinylbenzene (87:13 molar ratio) in a ratio of 85:3:12 to give an aqueous coating formulation of 10% solids by weight. The fumed alumina particles have a primary particle size of from about 7 to about 40 nm in diameter and are aggregated up to about 150 nm. Surfactants Zonyl® FSN (E.I. du Pont de Nemours and Co.) and Olin® 10OG (Dixie Chemical Co.) were added in small amounts as coating aids.

The above coating solutions were simultaneously bead-coated at 40° C. on polyethylene-coated paper base which had been previously subjected to a corona discharge treatment. The image-receiving layer was coated on top of the base layer. The coating was then dried at 60° C. by forced air to yield a two-layer recording element in which the thicknesses of the bottom and topmost layers were 40 $\mu$m (43 g/m$^2$) and 2 $\mu$m (2.2 g/m$^2$) respectively.

Printing of Test Images

Inks 1–5 and C-1 were filtered through a 0.2 $\mu$m polytetrafluoroethylene filter, degassed using ultrasonic treatment with an applied vacuum of 559 mm of mercury and placed in a clean Mutoh ink bag. Each bag was mounted in the plastic Mutoh bag cartridge and placed in the appropriate color slot in a Mutoh 4100 printer.

Ink 1–5 and C-1 were printed with a Mutoh 4100 printer without color correction at 283 dots per centimeter (720 dpi) bi-directional printing, with "microdot on" setting giving a droplet size of about 17 picoliters.

A test image consisting of a series of 6 variable density patches, approximately 7 by 7 mm in size, at 10, 25, 40, 50, 75 and 100% dot coverage was printed onto the porous ink jet recording element described above.

Evaluation of Test Images

For each of the test images, the spectral absorption curves spanning the full density range were measured over the wavelength range of 380–730 nm using measurement conditions of D5000 illumination, 2° observer angle, and no filter. The characteristic vectors (transmission density versus wavelength) were calculated as described above assuming a flare value of 0.0.

Color Gamut

Using the characteristic vector method described above, color gamuts for the ink sets shown in Table 2 were calculated as described in J. Photographic Science, 38, 163 (1990). Because differences in density can impact the calculation of color gamut and mask differences due to the spectral absorption characteristics of the dyes, the Status A densities for the cyan, magenta, yellow and black images were assumed to all be equal to 2.0 for the purposes of the calculations.

TABLE 2

| Ink Set | Cyan Ink | Magenta Ink | Yellow Ink | Black Ink | Color Gamut |
|---|---|---|---|---|---|
| 1 | 1 | 2* | 3 | 4 | 65,071 |
| Control-1 | C-1* | 2* | 3 | 4 | 63,817 |
| 2 | 1 | 2* | 5* | 4 | 60,750 |
| Control-2 | C-1* | 2* | 5* | 4 | 59,440 |

*Disclosed in WO 01/18123

The above data show that the ink sets employed in the invention had better color gamut than similar prior art ink sets having the same black, yellow and magenta inks, but with a different cyan ink.

The invention has been described in detail with particular reference to useful embodiments thereof, but it will be understood that variations and modifications can be effected within the spirit and scope of the invention.

What is claimed is:

1. An ink jet printing method, comprising the steps of:
   A) providing an ink jet printer that is responsive to digital data signals;
   B) loading said printer with an ink-receiving element comprising a support having thereon an ink-receiving layer;
   C) loading said printer with an ink jet ink set for color printing comprising:
      (a) a yellow ink comprising a carrier and a yellow azoaniline dye;
      (b) a magenta ink comprising a carrier and a magenta anthrapyridone dye; and
      (c) a cyan ink comprising a carrier and Direct Blue 307; and
   D) printing on said ink-receiving layer using said inkjet ink in response to said digital data signals;
   wherein said magenta anthrapyridone dye is a sulfonic acid or sulfonate derivative of a compound represented by the general formula.

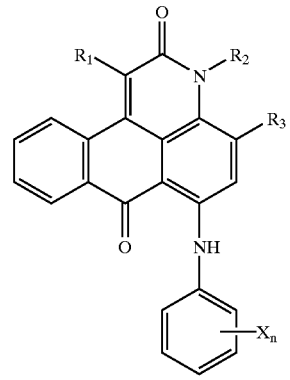

wherein:
   $R_1$ represents hydrogen, or a substituted or unsubstituted alkoxycarbonyl, carboxyl, benzoyl, alkyl, aryl, hetaryl, alkoxy or phenoxy group;
   $R_2$ represents hydrogen or a substituted or unsubstituted alkyl, alicyclic, aryl or hetaryl group;
   $R_3$ represents hydrogen, carboxyl, or a substituted or unsubstituted alkyl, alicyclic, aryl, hetaryl, alkoxy or phenoxy group;
   each X independently represents hydrogen, halogen, nitro, hydroxyl, carboxyl, or a substituted or unsubstituted alkyl, alicyclic, aryl, hetaryl, alkoxy, phenoxy, amino, amido or sulfonamido group; and
   n represents 0, 1, 2 or 3; said compound not containing a quaternary ammonium or phosphonium counter ion.

2. The method of claim 1 wherein said yellow azoaniline dye is Direct Yellow 132, Direct Yellow 107, Direct Yellow 86 or mixtures thereof.

3. The method of claim 1 wherein $R_1$ is benzoyl.

4. The method of claim 1 wherein $R_2$ is hydrogen.

5. The method of claim 1 wherein $R_3$ is a sulfonated phenoxy group.

6. The method of claim 1 wherein n is 1 and X is a sulfonate group.

7. The method of claim 1 wherein each ink contains from about 5 to about 60 weight percent of a humectant.

8. The method of claim 1 wherein each ink contains a surfactant.

9. The method of claim 1 further comprising an additional ink of a carrier and a black colorant.

10. The method of claim 9 wherein said black colorant is Reactive Black 31, Direct Black 19, Direct Black 168, Solubilized Sulfur Black 1 or a black pigment.

11. The method of claim 1 wherein each said carrier is water.

12. The method of claim 1 wherein each ink contains 0.1 to 10.0 weight percent of dye.

13. The method of claim 1 further comprising a light cyan ink (d) comprising a carrier and said cyan dye in (c) but at a concentration of about 5% to about 50% of the amount of said cyan dye in (c).

14. The method of claim 1 further comprising a light magenta ink (e) comprising a carrier and said magenta dye in (b) but at a concentration of about 5% to about 50% of the amount of said magenta dye in (b).

* * * * *